(No Model.)
F. P. SKORNICKI.
ROLLER SKATE.
No. 584,654.  Patented June 15, 1897.
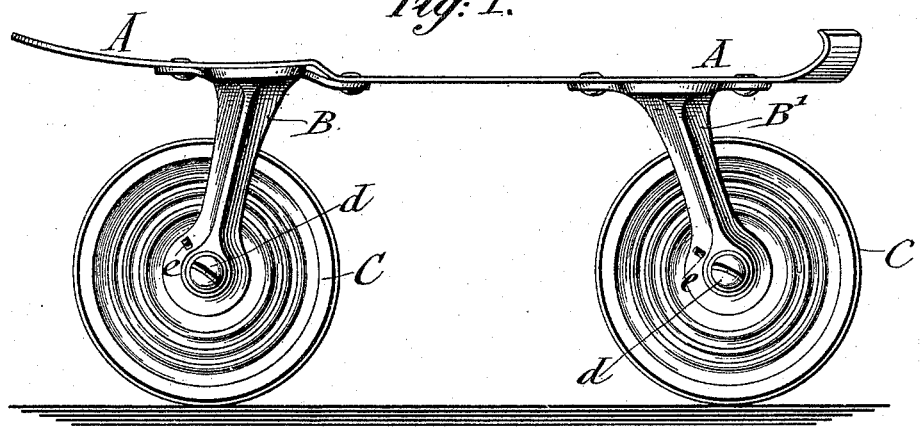
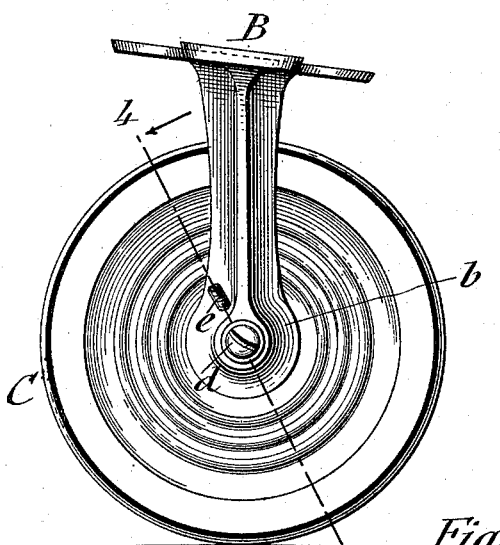
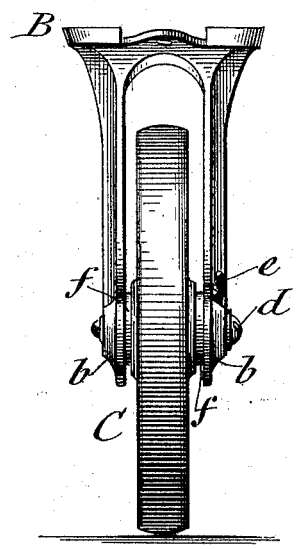
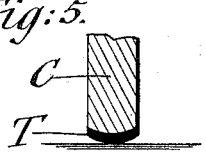
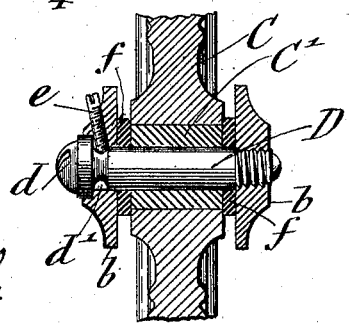
WITNESSES:
Fr. N. Roehrich.
Geo. W. Jackel.
INVENTOR
Felix Peter Skornicki
BY
Gowel Raegener
ATTORNEYS.
THE NORRIS PETERS CO., PHOTO-LITHO., WASHINGTON, D. C.

UNITED STATES PATENT OFFICE.

FELIX PETER SKORNICKI, OF JERSEY CITY, NEW JERSEY.

ROLLER-SKATE.

SPECIFICATION forming part of Letters Patent No. 584,654, dated June 15, 1897.

Application filed December 8, 1896. Serial No. 614,866. (No model.)

*To all whom it may concern:*

Be it known that I, FELIX PETER SKORNICKI, a citizen of the United States, residing at Jersey City, in the county of Hudson and State of New Jersey, have invented certain new and useful Improvements in Roller-Skates, of which the following is a specification.

This invention relates to a roller-skate of that form in which two large wheels are used, the object of the invention being to render the construction simple, durable, and efficient.

My invention consists of a roller-skate comprising a foot-plate, to which are riveted, or otherwise suitably fastened, a pair of yokes for the front and rear wheels, respectively, said wheels being bushed, axles each provided at one end with a screw-thread and which can be screwed into one of the bifurcations of the yoke, and at the other end provided with an annular groove and a nickel head, washers arranged between the bifurcations of the yoke and the sides of the wheel, and set-screws set into screw-threaded perforations in the hubs of the bifurcations of the yokes, so that said set-screws project into the annular grooves of said axles, as will be hereinafter fully described and then particularly claimed.

In the accompanying drawings, Figure 1 is a side elevation of my improved roller-skate. Fig. 2 is an enlarged side elevation of a yoke and a wheel mounted therein. Fig. 3 is a front elevation of the same parts. Fig. 4 is an enlarged broken transverse section on line 4 4, Fig. 2, showing the central part of the wheel or hub of the same. Figs. 5 and 6, respectively, are broken detail sectional views showing, respectively, a flat tire and hollow tire, both of rubber.

Similar letters of reference indicate corresponding parts.

Referring to the drawings, A indicates the foot-plate of my improved skate, to which is attached a pair of yokes or castings B B'. Said yokes are provided at their lower ends with enlarged hubs $b$, which are open, so as to receive the axles D. Each axle D furnishes the journal for a wheel C, two of which wheels are shown. Each wheel C is provided with a central antifriction-bushing C', through which bushing the axle D passes, said axle being provided at one end with a screw-thread which screws into one of the screw-threaded hubs $b$ of one yoke, as shown clearly in Fig. 4, and which at its other end is provided with an enlarged nickel head $d$, adjacent to which head the axle is provided with an annular groove $d'$, said head $d$ of each axle being slightly countersunk in the hub of the yoke which is opposite to the screw-threaded hub.

For the purpose of firmly setting the axle in position the recessed hub of the yoke is provided with a radial screw-threaded bore, into which is screwed a set-screw $e$, which is screwed in so far as that its inner end extends into the annular groove $d'$ in the axle.

The described construction furnishes a simple and durable means for attaching the axle to the yoke, and for the purpose of preventing the rubbing of the sides of the wheels against the yoke, and so that the wheels will clear the same, suitable washers $f$ are interposed between the bifurcations of the yoke and the wheel. The wheels are preferably provided with cushion-tires, such, for instance, as shown in Figs. 5 and 6, in which former figure the tire T is shown as composed of flat rubber, while in the latter figure it is shown as composed of a hollow tube of rubber.

Having thus described my invention, I claim as new and desire to secure by Letters Patent—

A roller-skate consisting of a foot-plate, yokes secured thereto, each terminating in two hubs, one of which is provided with screw-threads and the other having a smooth bore, a countersink and an inclined threaded bolt-hole communicating with said smooth bore, axles threaded at one end and having an annular groove and enlarged head at the other end, and a threaded bolt projecting into said groove, substantially as set forth.

In testimony that I claim the foregoing as my invention I have signed my name in presence of two subscribing witnesses.

FELIX PETER SKORNICKI.

Witnesses:
PAUL GOEPEL,
GEO. W. JAEKEL.